United States Patent [19]

Shirai

[11] Patent Number: 5,508,134
[45] Date of Patent: Apr. 16, 1996

[54] LIQUID CRYSTAL ELEMENT MANUFACTURING METHOD

[75] Inventor: Yoshihiro Shirai, Yamatokoriyama, Japan

[73] Assignee: Sharp Kabushiki Kaisha, Osaka, Japan

[21] Appl. No.: 267,455

[22] Filed: Jun. 28, 1994

[30] Foreign Application Priority Data

Jun. 29, 1993 [JP] Japan ................................ 5-159557

[51] Int. Cl.$^6$ .......................... C07K 19/00; G02F 1/1335
[52] U.S. Cl. .................... 430/20; 359/67; 359/68
[58] Field of Search .......................... 359/68, 67; 430/20

[56] References Cited

U.S. PATENT DOCUMENTS

| 4,568,149 | 2/1986 | Sugata et al. | 350/334 |
| 4,812,387 | 3/1989 | Suzuki et al. | 430/20 |
| 4,873,175 | 10/1989 | Suzuki et al. | 430/20 |

FOREIGN PATENT DOCUMENTS

| 59-90818 | 5/1984 | Japan . |
| 59-223404 | 12/1984 | Japan . |
| 62-135809A | 6/1987 | Japan . |
| 62-135809 | 6/1987 | Japan . |
| 62-247331A | 10/1987 | Japan . |
| 62-247331 | 10/1987 | Japan . |
| 4-003121A | 1/1992 | Japan . |
| 4-002161B | 1/1992 | Japan . |
| 4-3121 | 1/1992 | Japan . |
| 5-049967B | 7/1993 | Japan . |
| 5-232312A | 9/1993 | Japan . |
| 5-232312 | 9/1993 | Japan . |

*Primary Examiner*—Charles L. Bowers, Jr.
*Assistant Examiner*—J. Pasterczyk
*Attorney, Agent, or Firm*—David G. Conlin; Milton Oliver

[57] ABSTRACT

An object of the invention is to economically and easily form light-shielding means with high accuracy. An ITO film, which is used as transparent electrodes, and a resist layer are formed in this order on a surface of a light-transmitting substrate defining an X–Y plane. Thereafter, the resist layer is exposed, using a mask having a pattern corresponding to the transparent electrodes and developed. The bared ITO film is etched in a Z-direction to form the transparent electrodes. Then the light-shielding means is formed, by the use of an electrodeposition method, in a direction parallel to the insulating substrate, starting from a side surface of the transparent electrode not covered by the resist layer. After the completion of forming the light-shielding means, the resist layer on the transparent electrodes is removed. Thus, the steps of manufacturing the light shielding means are simplified.

7 Claims, 8 Drawing Sheets

LIQUID CRYSTAL ELEMENT MANUFACTURING METHOD

BACKGROUND OF THE INVENTION

1. Field of the Invention

The invention relates to a method of manufacturing liquid crystal element preferably applied to liquid crystal display apparatus of a super twisted nematic (STN) type, a thin film transistor (TFT) type, and a metal-insulator metal (MIM) type, and a liquid crystal optical apparatus such as optical shutters for a stereoscopic television and a liquid crystal printer, more particularly to a method of manufacturing a liquid crystal element having light shielding means, a so-called black mask.

2. Description of the Related Art

FIGS. 7A–7I are sectional views for showing the steps of a forming method of light shielding means 42 of the first prior art. A metallic chrome layer 42a used as light shielding means 42 is formed on all of one surface 41a of a light transmitting substrate 41 practiced by glass or the like as shown in FIG. 7A. The metallic chrome layer 42a is formed by the use of a vapor deposition method. A resist 43 is applied to the entire surface of the metallic chrome layer 42a as shown in FIG. 7B. The resist 43 is developed after being exposed by using a mask having a pattern corresponding to the light shielding means 42. Thereby the resist is patterned as shown in FIG. 7c. The metallic chrome layer 42a bared by developing the resist 43 is etched as shown in FIG. 7D and all of the residual resist 43 is removed, whereby the light shielding means 42 made of metallic chrome is patterned as shown in FIG. 7E.

In the case where the liquid crystal element is used in a liquid crystal color display apparatus, in addition to the above, a color filter 44, a transparent electrode 46, and an alignment layer 47 are formed. More specifically, the color filter 44 is formed in each region among adjacent light shielding means 42 to one another corresponding to one picture element as shown in FIG. 7F. The color filter 44, which has a thickness of e.g., about 1 μm, is composed for example, a red-color filter (R), a green-color filter (G) and a blue-color filter (B).

An overcoating layer 45 (e.g., about 2.5 μm thick) made of a material having a light transmitting property such as an acrylic resin is formed on the color filter 44 as shown in FIG. 7G and additionally the transparent electrode 46 is formed on the overcoating layer 45 as shown in FIG. 7H. The transparent electrode 46 is used as an electrode for displaying, which is practiced by a material such as indium tin oxide (ITO). The alignment layer 47, which is practiced by a material such as polyimide resin, is formed on the transparent electrode 46 as shown in FIG. 7I.

FIGS. 8A–8I are sectional views for showing the steps of a forming method of light shielding means 59 of the second prior art. The light shielding means 59 is formed in a liquid crystal color display apparatus, namely a region where a red-color filter (R) 52, green-color filter (G) 53 and a blue-color filter (B) 54 comprising a color filter are superimposed, is used as the light shielding means 59. For example, a photosensitive resin layer 52a to be used as the red filter (R) is formed on the entire of one surface 51a of a light transmitting substrate 51 as shown in FIG. 8A. The photosensitive resin layer 52a is developed after being exposed by using a mask having a pattern corresponding to the red-color filter (R) 52. Thereby the photosensitive layer is patterned as shown in FIG. 8B and is used as the red filter (R) 52. On the surface 51a, on a part of which the red-color filter (R) 52 is formed, a photosensitive resin layer 53a to be used as the green-filter (G) 53 is formed and the red-filter (R) 52 is enveloped in the photosensitive resin layer 53a as shown in FIG. 8C. The photosensitive resin layer 53a is developed after being exposed by using a mask having a pattern corresponding to the green-color filter (G) 53, whereby the layer 53a is patterned to be used as the green-color filter (G) 53 as shown in FIG. 8D. On the surface 51a, on a part of which the red-color filter (R) 52 and the green-color filter (G) 53 are formed, a photosensitive resin layer 54a to be used as the blue-color filter (B) 54 is formed and the red filter (R) 52 and the green-color filter (G) 53 are enveloped in the photosensitive resin layer 54a as shown in FIG. 8E. The photosensitive resin layer 54a is developed after being exposed by using a mask having a pattern shape corresponding to blue-color filter (B) 54, whereby the layer 54a is patterned to be used as the blue-color filter (B) 54 as shown in FIG. 8F. The region where the filter (R) 52, green-color filter (G) 53 and blue filter (B) 54 are superimposed is used as light shielding means 59.

Besides, an overcoating layer 56 made of light transmitting resin is formed as shown in FIG. 8G, and a transparent electrode 57, which is practiced by a material such as ITO and used as a display electrode, is formed as shown in FIG. 8H. An alignment layer 58, which is practiced by a material such as polymide resin, is formed in the transparent electrode 57 as shown in FIG. 8I.

Such light shielding means 42, 59 are applied to, for example, a liquid crystal color display apparatus of a transmissive-type in order to enhance the contrast ratio. In other words, the light shielding means 42, 59 are provided for the purpose of shielding the light of a back light which breaks through a gap between picture elements. Accordingly, the light leakage through the element in the unselected mode decreases, which leads to the improvement of the image contrast.

The finer the image is made, the more the light leakage through the gap between the picture elements increases. This is because, while the dot pitch of the electrode shape is more narrowed with making the image resolution higher, narrowing an electrode pitch has limitations due to problems in accuracy attributable to an exposure apparatus, and the ratio of an ineffective display area to an effective display area increases. Further, since the ratio for a liquid crystal color display is higher as compared with that for a black-and-white type liquid crystal display, the light leakage of the liquid crystal color display is more significant. Therefore, the light shielding means 42, 59 as mentioned above are preferably employed.

Besides the light shielding means 42, 59, U.S. Pat. No. 4,568,149, Sugata et al., discloses an example that light shielding means comprising A1 is formed between adjacent picture elements on transparent electrodes. Still further, Japanese Unexamined Patent Publication (KOKAI) NO.JP-A 62-135809 (1987), SAITO discloses an example that a light shielding means made of metallic oxide is formed in a region where a patterned transparent electrode is not formed by employing the patterned transparent electrode made of ITO and a photoresist formed thereon as a mask. Yet further, Japanese Unexamined Patent Publication (KOKAI) NO. JP-A 4-3121 (1992) discloses an example that a transparent electrode made of ITO is reduced, whereby it is employed as light shielding means.

Since a color filter 44 (e.g., about 1 μm thick) and a. overcoating layer 45 (e.g., about 2.5 μm thick) are formed on the light shielding means 42, the insulation between a metallic chrome layer of the light shielding means 42 and the transparent electrode can be easily held. However, the light shielding means has a problem that the yield is low due to the complexity of the formation method and as a result the manufacturing cost becomes high. The problem of the high manufacturing cost is more noticeable in a STN-type liquid crystal black-and-white display apparatus. Additionally, since the color filter is unnecessary in the liquid crystal black-and-white display apparatus, there arises a problem that the insulation between the metallic chrome layer of the light shielding means and the transparent electrode can not be held. A similar problem arises also in U.S. Pat. No. 4,568,149 mentioned above.

Further, since a region where a red color filter (R) 52, a green color filter (G) 53, and a blue color filter (B) 54 are superimposed is used as the light shielding means, such light shielding means is employed in a liquid crystal color display apparatus. Accordingly such a liquid crystal color display apparatus can be manufactured in simplified manufacturing steps. The liquid crystal color display apparatus, however, has a problem of insufficiency of light shielding property because laminated red-, green-, and blue-color filters which have a relatively high light-transmittance are employed as light shielding means. In addition to the problem, the liquid crystal color display apparatus has a further problem that unsuitable orientation of liquid crystal molecules easily occurs because the thickness of the region of the shielding means 59 is thicker than that of other regions. Moreover, a liquid crystal black-and-white display apparatus requiring no color filters has a problem that the cost for forming the light shielding means 59 becomes higher.

Reduced materials from metallic oxides and ITO of which the light shielding means disclosed in Japanese Unexamined Patent Publication JPA 62-135809 and Japanese Unexamined Patent Publication JPA 4-3121 are made, respectively, have a problem of less light shielding property. On the other hand, in the case where a material with a more metallic property is employed in order to improve the light shielding property, another problem of short circuit occurs.

As mentioned above, the formation method of the conventional light shielding means costs too much by virtue of its own complicated steps and the light shielding means formed thereby has only less light shielding property. Additionally, the image quality is low due to unsuitable orientation of liquid crystal molecules. Accordingly, such light shielding means has not been employed particularly in a liquid crystal black-and-white display apparatus.

SUMMARY OF THE INVENTION

An object of the invention is to provide a method of manufacturing a liquid crystal element provided with light shielding means which can be manufactured easily, economically and accurately.

The invention provides a method of manufacturing a liquid crystal element wherein a liquid crystal layer is interposed between a pair of substrate members at least either one of which has a light transmitting property and at least either one has shielding means, the method comprising the steps of:

forming an electroconducting layer on a surface of an insulating substrate composing one of the substrate members;

applying a resist on a surface of the electroconducting layer;

exposing the resist with a mask having a predetermined pattern;

developing the exposed resist;

removing an electroconducting layer bared by developing the resist to form an electrode in the predetermined pattern;

forming light shielding means extending from an electrode surface perpendicular to the insulating substrate in a direction parallel to the insulating substrate by the use of an electrodeposition method; and removing all of the resist on the electrode.

Further, the invention provides a manufacturing method of a liquid crystal element wherein a liquid crystal layer is interposed between a pair of substrate members at least either one of which has a light transmitting property and which have light shielding means, the method comprising the steps of:

forming an electroconducting layer on a surface of an insulating substrate;

applying a resist on a surface of the electroconducting layer;

exposing the resist with a mask having a predetermined pattern of a plurality of stripes parallel to one another;

developing the exposed resist;

removing an electroconducting layer bared by developing the resist to form electrodes in the predetermined pattern;

forming light shielding means extending from an electrode surface perpendicular to the insulating substrate in a direction parallel to the insulating substrate by the use of electrodeposition method;

removing all of the resist on the electrodes;

forming an alignment layer enveloping the electrodes and the light shielding means in order to form a substrate member;

bonding a pair of substrate members manufactured in the above-manner leaving a predetermined space therebetween so that the alignment layers thereof are opposed to each other and the electrodes thereof are right-angled with each other; and injecting a liquid crystal between the pair of substrate members.

The invention is characterized in that the electrodes, which are to be utilized as anodes, are dipped into an electrolyte with a cathode, and a DC voltage is applied between the anodes and the cathode in order to form light shielding means.

Further, the invention is characterized in that the electrodes, which are to be used as cathodes are dipped into an electrolyte with an anode, and a DC voltage is applied between the cathodes and the anode in order to form light shielding means.

Further, the invention is characterized in that the electrolyte contains a polymeric material and a colorant.

Further, the invention is characterized in that heating treatment is carried out just after forming the light shielding means.

According to the invention, at least one of a pair of planar substrate members sandwiching a liquid crystal layer has light shielding means. In order to form the light shielding means, first an electroconducting layer is formed on the surface of an insulating substrate composing a substrate member. Secondly a resist is applied on the electroconducting layer, and the resist is exposed to light using a mask having a predetermined pattern and developed. Then an electroconducting layer bared by the developing is removed, whereby electrodes are formed in the predetermined pattern. Subsequently light shielding means is formed on a substrate surface bared by removing the electroconducting layer. In other words, the light shielding means is formed so as to extend from an electrode surface perpendicular to the insulating substrate in a direction parallel to the insulating substrate by the use of an electrodeposition method. After formation of the light shielding means, the resist on the electrodes is all removed.

The electrodeposition method is one for depositing and adhering a polymeric material dissolved or dispersed in a solvent and a colorant such as a pigment and a dyestuff on an electrode by virtue of an electrophoresis phenomenon. Such a manner is applied, for example, to coating of automobiles. The Japanese Examined Patent Publication (KOKOKU) No. JP(B2) 4-2161 (1992), SUGINOYA, discloses an example of forming a multicolored film.

The above-mentioned light shielding means is formed on the side face of the electroconducting layer, which is used, for example, as a display electrode. The light shielding means can be easily and economically manufactured in comparison with one manufactured in a conventional manner.

As described above, the formation of the light shielding means is initiated from the electrode surface uncovered with the resist, namely, from the side face of the patterned electrode toward a direction parallel to the substrate surface. Light shielding means between the adjacent electrodes are extended in a direction parallel to the substrate surface to be opposed to each other and unified with each other by fusion. Thus, light shielding means with a thickness almost equal to that of the electrodes can be formed with high positioning accuracy. Accordingly, the surface to be contacted with liquid crystal molecules has an improved smoothness. That leads to the improvement of the orientation uniformity of the liquid crystal molecules, namely the improvement of image quality of a display apparatus.

Further, according to the invention, the resist is exposed with a mask having a pattern of a plurality of stripes parallel with one another and as a result the electrodes figuring the pattern of the mask are formed. Light shielding means are formed so as to extend from an electrode surface perpendicular to the insulating substrate in a direction parallel to the insulating substrate by the use of the electrodeposition method. Additionally, an alignment layer is formed to envelope the electrodes and light shielding means and thereby a substrate member is completed. A pair of substrate members thus formed are bonded leaving a predetermined space therebetween so that the alignment layers of the respective substrate members are opposed to each other and the electrodes of one of the pair of substrate members make right angles with those of the other of the pair of substrate members and then a liquid crystal is injected between the pair of substrate members.

The liquid crystal element thus obtained is of a simple matrix type and regions in which the electrodes of the one of the pair of substrate members intersect those of the other of the pair of substrate members can be utilized as picture elements for displaying. Namely, according to the invention, the electrodes used for the purpose of displaying are also utilized as ones for electrodeposition. As a result, the constitution of the substrate member can be simplified, and the substrate member can be manufactured in reduced steps, which leads to decrease in manufacturing cost. Additionally, since the light shielding means can be formed by electrodeposition to have a thickness almost equal to that of the electrodes with high positioning accuracy, the smoothness of the surface to be contacted with liquid crystal molecules is improved. That leads to the improvement of the orientation uniformity of the liquid crystal molecules, namely the improvement of image quality of a display apparatus.

Further according to the invention, the electrodes, which are used as anodes, are dipped into an electrolyte with a cathode. A DC voltage is applied between the anodes and the cathode to form light shielding means on the surfaces of the electrodes, namely, of the anodes. The electrodeposition method of the invention wherein the anodes are utilized as objects to be coated is called anion electrodeposition method. In the anion electrodeposition method, the electrodes for displaying are used as anodes in order to form the light shielding means on the surfaces thereof. Accordingly, there never occurs reduction of the electrodes.

Further according to the invention, the electrodes, which are used as cathodes, are dipped into an electrolyte with an anode. A DC voltage is applied between the cathodes and the anode to form light shielding means on the surfaces of the electrodes, namely, of the cathodes. The electrodeposition method of the invention wherein the cathodes are utilized as objects to be coated is a so-called cation electrodeposition method. In the cation electrodeposition method, the electrodes for displaying are used as anodes in order form the light shielding means on the surfaces thereof. A material of the electrodes for displaying includes an ITO film, and a NESA film (tin oxide film). Since the surfaces of these oxide films are reduced by virtue of electrodeposition, the films are changed into In or Sn and the light transmittance of the electrodes decreases. Consequently, the cation electrodeposition method is not employed for manufacturing a color filter. According to the invention, however, since the light shielding means is formed on the side face of the display electrode and it is the side face of the display electrode that is reduced and changed into metal, the effect of the light shielding means on the light transmittance of the entire electrode is insignificant. Thus, according to the invention, the light shielding means may be manufactured in the cation electrodeposition method.

Further, according to the invention, the electrolyte contains a polymeric material and a colorant. As a polymeric material an anionic resin is employed in the case of the anion electrodeposition method, and in the case of the cation electrodeposition method a cations resin. A red-color, a blue-color and a green-color pigment are employed. A desired light shielding means can be formed by using a suitable quantity of these materials.

Still further, according to the invention, heat treatment is carried out just after the formation of the light shielding means. Since by virtue of the heat treatment the molecules of the coating polymeric material are cross-linked, the molecular bond is strengthened. As a result, the light shielding means is improved in chemical and physical properties.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
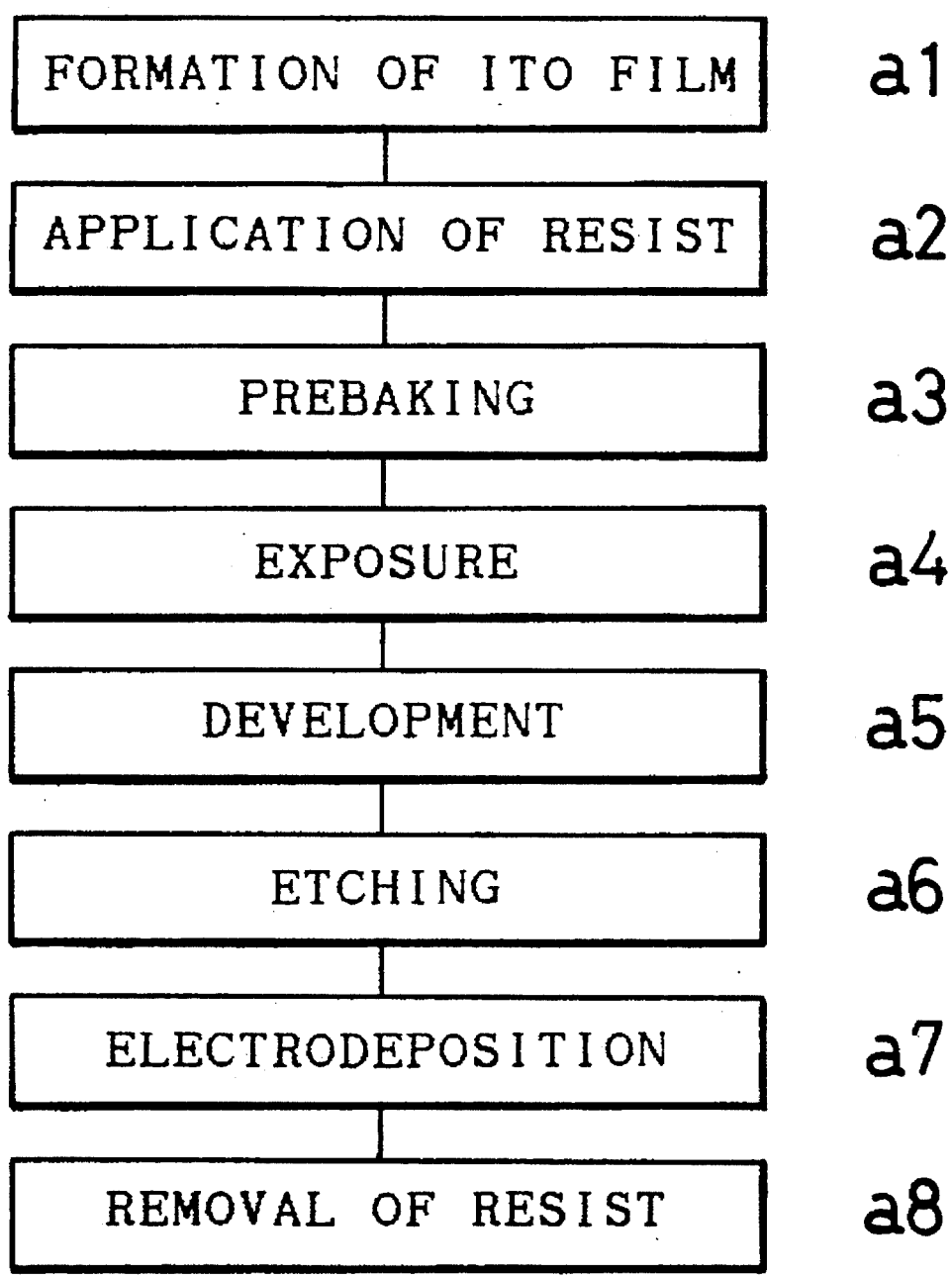
FIG. 1 is a flow chart showing a formation method of light shielding means 4 of a liquid crystal display apparatus 20 of an embodiment of the invention.

Now referring to the drawings, preferred embodiments of the invention are described below.

FIG. 1 is a flow chart showing a formation method of light shielding means 4 of a liquid crystal display apparatus 20 of an embodiment of the invention. FIGS. 2A–2F are sectional views illustrating formation steps of the light shielding means 4.

Figure 2:
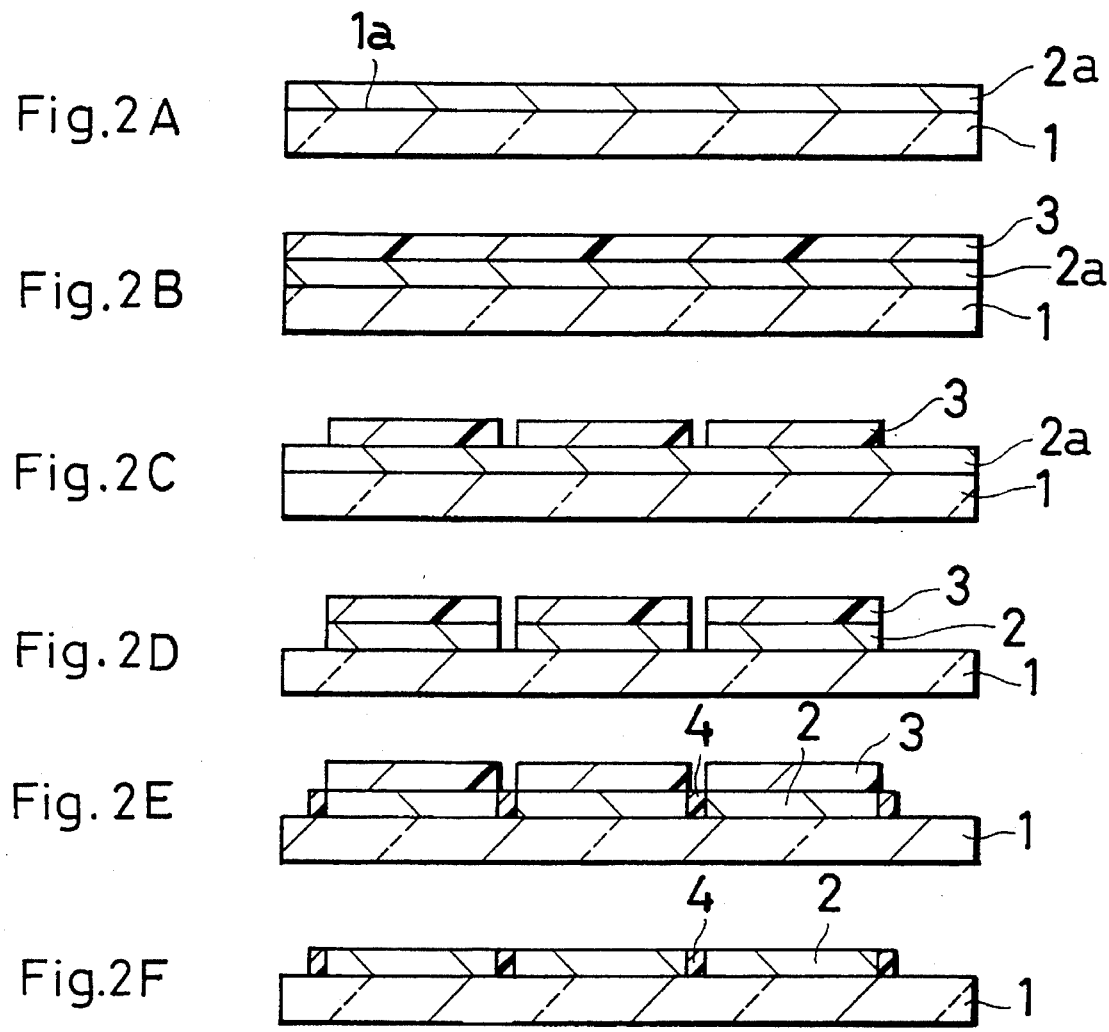
FIGS. 2A–2F are sectional views illustrating formation steps of the light shielding means 4.

As shown in FIG. 2A, an ITO film 2a to be used as transparent electrodes 2 is formed on the entire of one surface 1a of a light transmitting substrate 1 with an insulating property (e.g., practiced by glass) in step a1. The ITO film 2a (e.g., 2500 Å thick) is formed in a sputtering method.

As shown in FIG. 2B, in order to form a resist layer 3 a resist is applied on the ITO film 2a in step a2. As the resist is employed, for example, a positive-type photoresist under the trade name "FH 2030D" made by Fuji Hunt Electronics Technology Co. The application is conducted, for example, by the use of a roll coater.

In step a3, prebaking treatment is carried out at 140° C. for half-hour using a heating apparatus such as an oven.

In step a4, exposure treatment is carried out using a mask having an electrode pattern corresponding to below-mentioned transparent electrodes 2.

In step a5, development treatment is carried out. As shown in FIG. 2C, the resist layer 3 solubilized by the exposure treatment is removed by the development treatment.

As shown in FIG. 2D, the ITO film 2a bared by the development treatment is etched to form the transparent electrodes 2 made of ITO in step a6. In this embodiment, a plurality of transparent electrodes 2 with a width of 200 μm were formed so as to be strip-shaped, and parallel with one another, and further so as to have an interval of 20 μm thereamong.

In step a7, light shielding means 4 is formed in an electrodeposition method. In this step, a part of the resist layer 3 on one longitudinal end of the strip-shaped electrode 2 is removed in order to form an electrode terminal for conducting electrodeposition and the bared surface is washed by water and dried. Additionally, the remaining resist layer 3 is baked at 200° C. for an hour. Subsequently, an electroconducting tape to be used as an electrodeposition terminal is stuck onto the bared surface of the transparent electrode 2 and electrodeposition is carried out. As shown in FIG. 2E, light shielding means 4 is formed on the side face of the transparent electrode 2. Subsequently, the light shielding means 4 is baked for an hour, for example, at 170° C.

The molecules of the light shielding means 4 are bridged and the molecular bonding is strengthened by virtue of the baking. As a result, chemical and physical properties of the light shielding means 4 are improved.

As shown in FIG. 2F, all of the remaining resist layer 3 is removed in step a8. After removing the resist layer 3 by the use of, for example, 3 wt % solution of NaOH, the bared surface is washed by water and dried.

Figure 3:
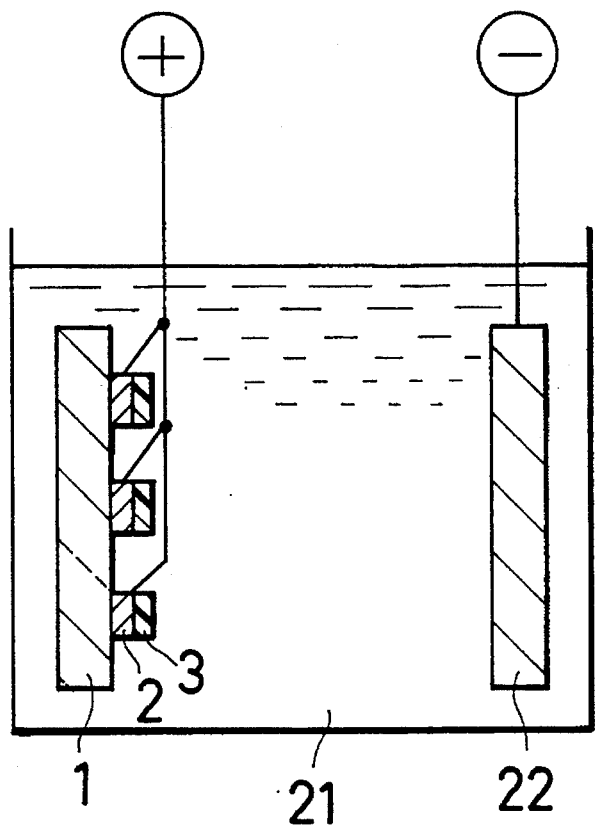
FIG. 3 is a sectional view for explaining a electrodeposition method.

FIG. 3 is a sectional view for explaining the above-mentioned electrodeposition. The electrodeposition means that a polymeric material dissolved or dispersed in a solvent and a colorant such as a pigment or dyestuff are adhered to an electrode by an electrophoresis phenomenon. In an electrodeposition bath 21 in which a red-color, a blue-color, and a green-color pigment, a water soluble epoxy resin, a cellosolve solvent, and water are mixed are dipped a light transmitting substrate 1 having the transparent electrode 2 and resist layer 3 formed by patterning and a counter electrode 22, and a DC voltage is applied employing the transparent electrodes 2 as anodes and the counter electrode 22 as a cathode. Such an electrodeposition method that deposition occurs on an anode is a so-called anion electrodeposition method. The formation of the light shielding means 4 can be conducted not only in the anion electrodeposition method, but also indication electrodeposition method that deposition occurs on a cathode when a voltage is applied employing the transparent electrodes 2 as cathodes and the counter electrode 22 as an anode.

In the following are described practical manufacturing conditions of the formation of the light shielding means 4 in the anion and the cation electrodeposition method, giving examples. First, in the case of the anion electrodeposition method, for example, polyester melamine resin, and a black-color pigment consisting of a red-color, a blue-color, and a green-color pigment are employed as a polymeric material and a colorant, respectively. The following components are contained in the electrodeposition bath 21.

| polyethylene resin | 65 parts |
|---|---|
| melamine resin | 15 parts |
| red-color pigment | 10 parts |
| blue-color pigment | 10 parts |
| green-color pigment | 10 parts |
| ethylcellosolve | 20 parts |
| water | 880 parts |
| | 1,010 parts by weight |

The electrodes are dipped into the above-mentioned electrodeposition bath 21, and a DC voltage of 120 V is applied for a minute, employing the transparent electrodes 2 as anodes and the counter electrode 22 as a cathode.

Secondly, in the case of the cation electrodeposition method, for example, a cationic acrylic resin and the same black-color pigment as that of the above example in the anion electrodeposition method are employed as a polymeric material and a colorant, respectively. The following components are contained in the electrodeposition bath 21.

| acrylic resin | 50 parts |
|---|---|
| red-color pigment | 6 parts |
| blue-color element | 6 parts |
| green-color element | 6 parts |
| ethylcellosolve | 25 parts |
| isopropyl alcohol | 3 parts |
| sulfuric acid | 1.5 parts |
| water | 800 parts |
| | 897.5 parts by weight |

The electrodes are dipped in the above-mentioned electrodeposition bath 21, and employing the transparent electrodes 2 as cathodes and the counter electrode 22 as an anode, a DC voltage of 100 V is applied for three minutes.

Figure 4:
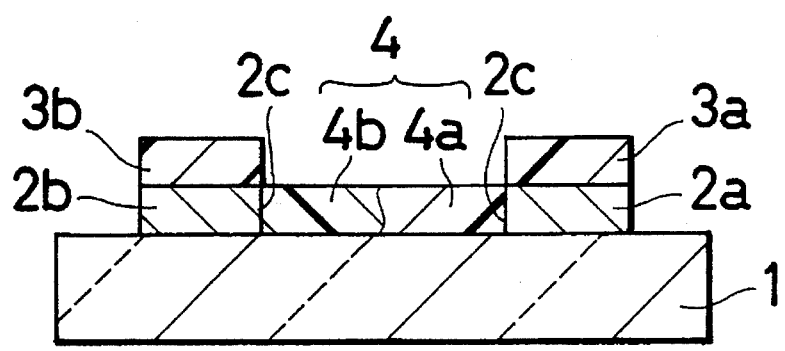
FIG. 4 is an enlarged sectional view of light shielding means 4 formed in the electrodeposition method.

FIG. 4 is an enlarged sectional view of light shielding means 4 formed in the electrodeposition method. When the above-mentioned electrodeposition is carried out, the formation of the light shielding means 4a, 4b is initiated from the side faces 2c of the transparent electrodes 2a, 2b which are perpendicular to a surface 1a of a light transmitting substrate 1 and uncoated with resist layers 3a, 3b. More specifically, the light shielding means 4a, 4b extending from the side surfaces 2c in parallel with the surface 1a of the light transmitting substrate are formed. Further, the light shielding means 4a, 4b formed between transparent electrodes 2a, 2b adjacent to each other are fused and become unified one. Thus, the light shielding means 4 having the same thickness as that of the transparent electrodes 2a, 2b can be formed in a desired position with high accuracy.

In the anion electrodeposition method, the transparent electrodes 2 are never reduced. Therefore, there is no occurrence of decrease of the light transmissivity of the electrodes 2. On the other hand, the transparent electrodes 2 are reduced in the cation electrodeposition. However, on the side surface 2c of the transparent electrode 2, the reduction of the side surface 2c, on which the light shielding means 4 of this embodiment is formed has little effectivity on the light transmissivity of the entire electrode 2. Accordingly, the light shielding means 4 can be formed also in the cation electrodeposition.

Figure 5:
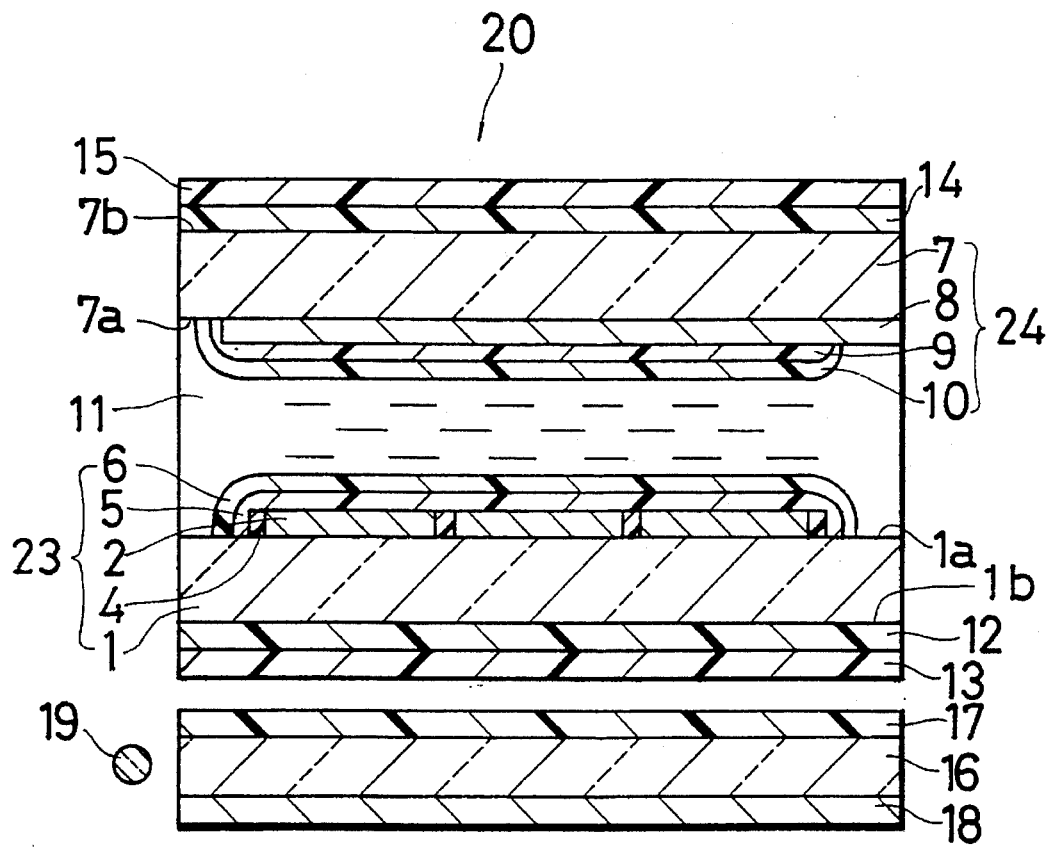
FIG. 5 is a sectional view showing a constitution of a liquid crystal display apparatus 20.

FIG. 5 is a sectional view showing a constitution of a liquid crystal display apparatus 20. The liquid crystal display apparatus 20 is of a STN-type employing a phase difference plate for black-and-white image, and comprises a pair of substrate members 23, 24, a liquid crystal layer 11, phase difference plates 12, 14, polarizing plates 13, 15, a light conducting plate 16, a light dispersing plate 17, a reflective plate 18 and a light source 19. The substrate member 23 comprises a light transmitting substrate 1, transparent electrodes 2, light shielding means 4, a top coating layer 5, and an alignment layer 6 and the other substrate member 24 comprises a light transmitting substrate 7, a transparent electrode 8, a top coating layer 9, an alignment layer 10 and light shielding means (not shown).

The transparent electrodes 2 and light shielding means 4 are formed on one surface 1a of the light transmitting substrate 1 comprising the substrate member 23 on a segment electrode side in the above-mentioned manner. The transparent electrodes 2 are formed so as to have a width of 200 μm and a spacing of 20 μm therebetween. An example of the number of the transparent electrodes 2 is 1,120. The light shielding means 4 is, as mentioned above, formed on the side face of the transparent electrodes 2. Further, the top coating layer 5 and the alignment layer 6 are formed in this order on the transparent electrodes 2 and the light shielding means 4.

On the other hand, the same as that of the substrate member 23, the transparent electrode 8 and the light shielding means (not shown) are formed on one surface 7a of the light transmitting substrate 7, which composes the substrate member 24 on a common electrode, has an insulating property like the light transmitting substrate, and is realized by glass or the like. Further, the top coating layer 9 and the alignment layer 10 are formed on the transparent electrode 8 in this order. A liquid crystal display apparatus 20 wherein such transparent electrode 2, 8 are formed is driven in a vertical two-divisional method.

The surface of the alignment layers 6, 10 realized by a material such as a polyimide resin is treated, for example, by rubbing.

Such a pair of substrate members 23, 24 are bonded leaving a predetermined space so that respective alignment layers 6, 10 are opposed to each other and the transparent electrodes 2 are at right angles to the transparent electrode 8. In this occasion, an injection hole for injecting a liquid crystal material is provided. A liquid crystal material is injected through the injection hole to form the liquid crystal layer 11. After injection, the injection hole is sealed.

The phase difference plates 12, 14 and the polarizing plate 13, 15 are laminated and bonded in this order on the other surfaces 1b, 7b of the light transmitting substrates 1, 7, respectively. Further, a large scale integrated circuit (LSI) etc, are connected. A liner light source 19 is arranged on a polarizing plate 13 side. The light from the light source 19 is guided by the light conducting plate 16 arranged on the side of the light transmitting substrate 1, reflected by the reflective plate 18, dispersed by the dispersing plate 17 and enters into the liquid crystal layer 11. The liquid crystal display device 20 is of a single matrix type, wherein a crossing portion of the transparent electrodes 2 of the substrate member 23 and the transparent electrode 8 of the substrate member 24 is used as picture elements.

Additionally, the periphery of a display screen is used as a light shielding region. For that purpose, 48 lines starting from one end of the 1120 segment electrodes, 48 lines from the other end thereof, 16 lines from one end of the 800 common electrodes and 16 lines from the other thereof are not used for display. As a result, displaying is conducted in 1024×768 dots. Further, the liquid crystal display apparatus 20 is driven in 374 duty. The contrast ratio of display under these conditions is 14:1. The ratio is improved in comparison with that (12:1) without light shielding means 4.

Such liquid crystal display apparatus 20 is preferably applied to a liquid crystal display apparatus for a work station, desk top publishing etc. of which a high resolution is required and a small liquid crystal display apparatus for a palm top computer.

Figure 6:
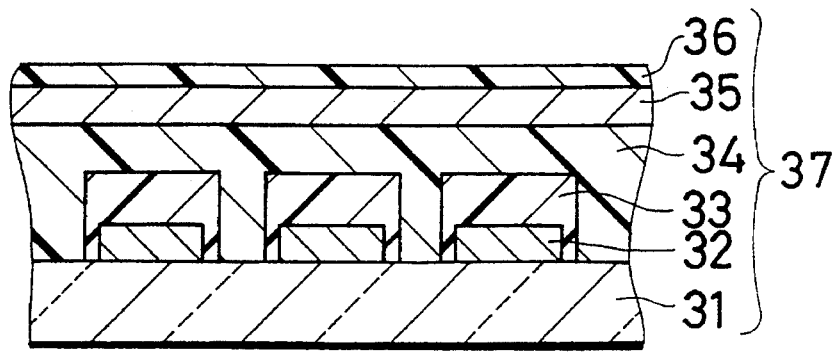
FIG. 6 is a sectional view showing a color filter 33 formed in the electrodeposition method.
Figure 7A:
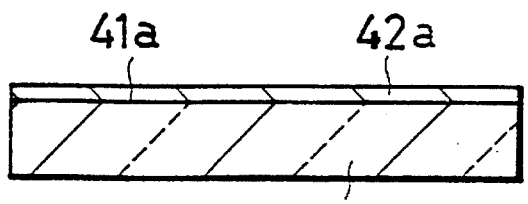
FIGS. 7A–7I are sectional views illustrating formation steps of light shielding means 42 of a first prior art.
Figure 7B:
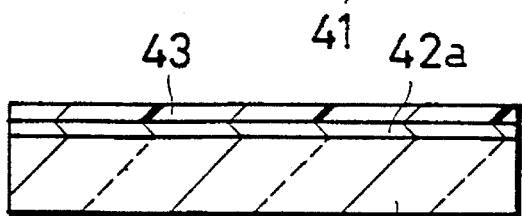
Figure 7C:
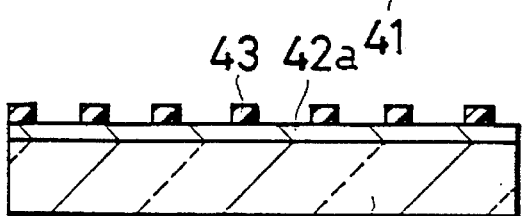
Figure 7D:
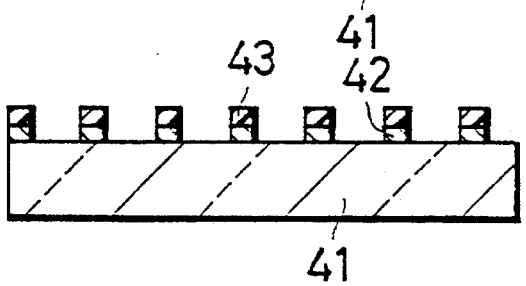
Figure 7E:
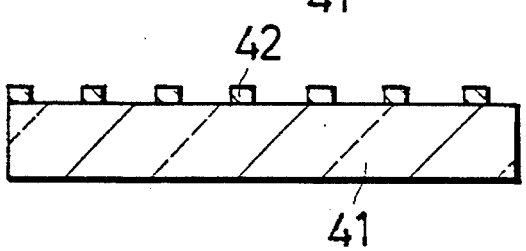
Figure 7F:
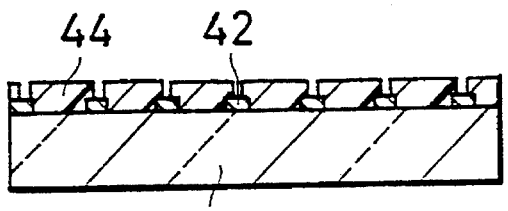
Figure 7G:
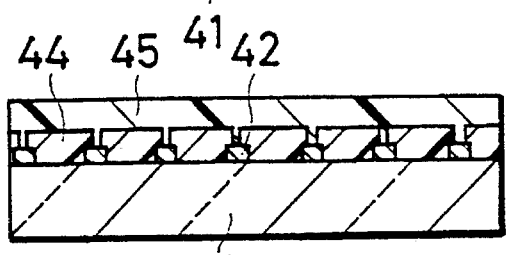
Figure 7H:
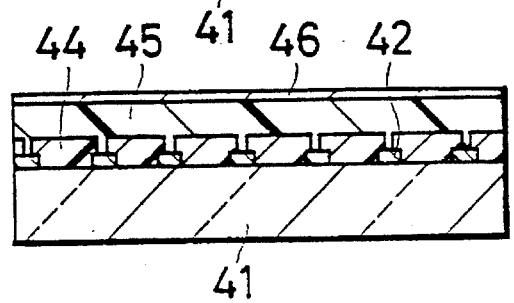
Figure 7I:
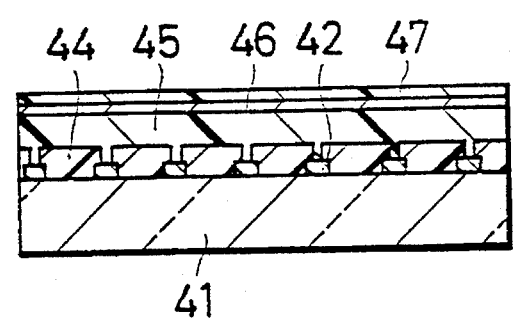
Figure 8A:
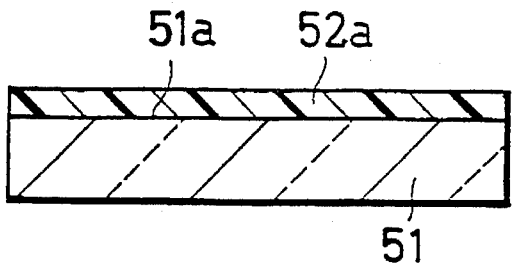
FIGS. 8A–8I are sectional views illustrating formation steps of light shielding means 59 of a second prior art.
Figure 8B:
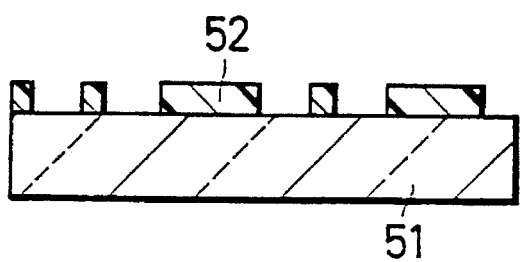
Figure 8C:
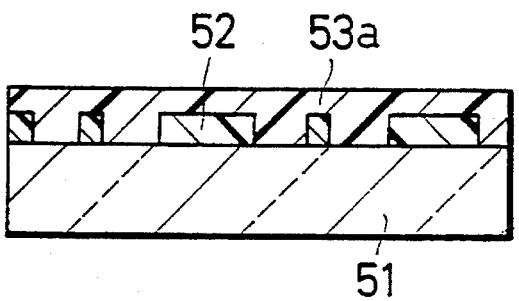
Figure 8D:
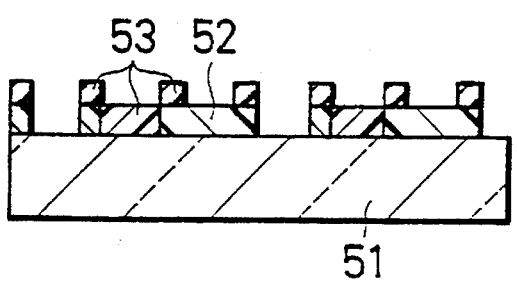
Figure 8E:
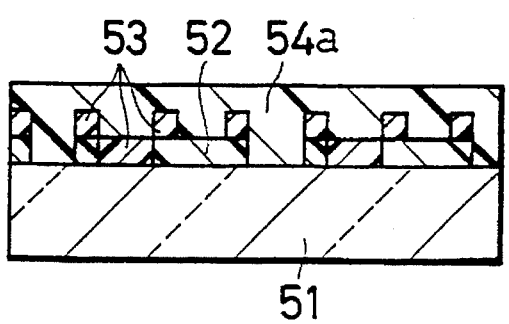
Figure 8F:
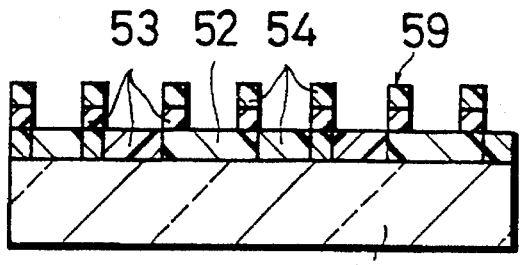
Figure 8G:
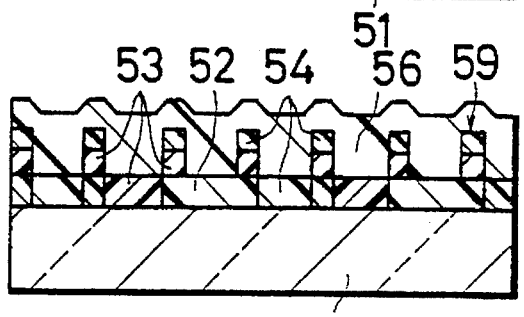
Figure 8H:
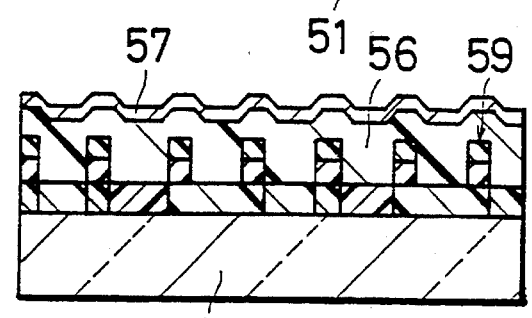
Figure 8I:
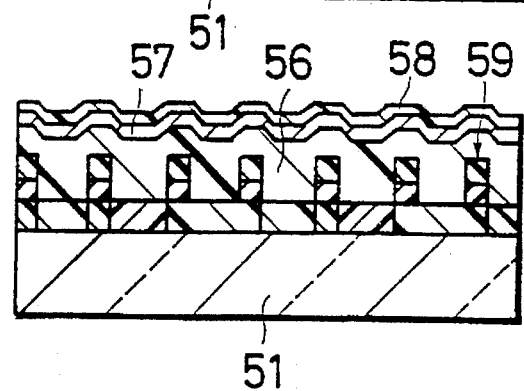

FIG. 6 is a sectional view showing a color filter 33 formed in the electrodeposition method. Since the color filter 33 is formed on a plurality of transparent electrodes 32 on the light transmitting substrate 31 which are stripe-shaped by patterning, the color filter 33 is also formed as a plurality of strip-shaped filters. The color filter is formed so as to have a thickness of about 1.5 μm. In this formation, the greatest possible care is taken so as to prevent the color filter from protruding out of the side faces of a electrode 32. An overcoating layer 34, which is realized by a synthetic resin having a light transmitting property, is formed on the color filter 33, and further a transparent electrode 35 and an alignment layer 36 are formed in this order. The transparent electrode 35, which is formed on the entire surface of the overcoating layer 34, is used as that for displaying.

The substrate member 37 in which the color filter 33 is thus formed is bonded with a substrate member in which, for example, a TFT element and a picture element electrode are formed, interposing a liquid crystal layer therebetween.

In the formation of the above-mentioned color filter 33, an electrode 32 for electrodeposition as well as an electrode 35 for display is necessary. However, the light shielding means 4 of this embodiment is formed using the transparent electrode 2 for display. Additionally, manufacturing steps are simplified in comparison with those of conventional light shielding means made of metallic chrome or made of laminated color filters. As a result, the manufacturing cost can be reduced.

In the embodiment, the light shielding means 4 is formed by the use of a water-soluble epoxy resin having a low transparency for the purpose of shielding light and to use as a water-soluble resin an acrylic-melamine resin, polyester-melamine resin, acrylic resin or the like is also in the scope of the invention.

As the resist layer 3, a negative-type photo-resist and a heat resistant photo-resist may be used as well as a positive-type photo-resist. $SnO_2$ and a complex of ITO or $SnO_2$ with a metal may be employed as transparent electrodes 2, 8 as well as ITO.

Additionally, a pigment may be contained in the electrodeposition bath 21, unlimited to an oil soluble black-color dye, and the above-mentioned resins may be contained therein.

Besides a cellosolve solvent, other solvents may be also used. Conditions for forming the light shielding means 4 are not limited to those described in the embodiments and may be suitably selected.

Further, in the embodiment is described an example of a liquid crystal display apparatus of a STN-type employing the phase difference plate for black-and-white image. However, a liquid crystal display apparatus of the invention can be applied to a STN-type, a ferroelectric, and an antiferroelectric liquid crystal display apparatus, and an active matrix type liquid crystal display apparatus using a TFT or MIM, in which the same effect can be obtained, regardless of black-and-white image or color image. Further the invention can be preferably applied to a liquid crystal optical apparatus including light shielding means such as optical shutters for a stereoscopic television and an optical printer.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A method of manufacturing a liquid crystal element, wherein a liquid crystal layer is interposed between a pair of planar substrate members, at least one of which has light-shielding means, comprising the steps of:

(a) forming an electroconducting layer on a surface of an insulating substrate defining one of the planar substrate members;

(b) applying a resist to the surface of the electroconducting layer;

(c) exposing the resist to light using a mask having a predetermined pattern;

(d) developing the exposed resist;

(e) removing portions of the electroconducting layer, bared by developing the resist, to form electrodes in the predetermined pattern;

(f) forming, by the use of an electrodeposition method, light-shielding means, extending from an electrode side-surface perpendicular to the planar insulating substrate in a direction parallel to the insulating substrate; and (g) removing all of the resist on the electrodes.

2. A method of manufacturing a liquid crystal element, wherein a liquid crystal layer is interposed between a pair of planar substrate members, at least one of which has a light-transmitting property and both of which have light-shielding means and which define an X–Y plane,, comprising the steps of:

(a) forming an electroconducting layer on a surface of an insulating one of said planar substrate members;

(b) applying a resist to the surface of the electroconducting layer;

(c) exposing the resist to light using a mask having a predetermined pattern of a plurality of stripes in parallel to one another;

(d) developing the exposed resist;

(e) removing, in a Z-direction, portions of the electroconducting layer, bared by developing the resist, to form electrodes in the predetermined pattern;

(f) forming, by the use of an electrodeposition method, light-shielding means, extending from an electrode side-surface perpendicular to the planar insulating substrate in a direction parallel to the insulating substrate; and (g) removing all of the resist on the electrodes;

(h) forming an alignment layer enveloping the electrodes and the light-shielding means in order to form a substrate member;

(i) bonding a pair of substrate members, manufactured in the above manner, leaving a predetermined space therebetween, so that the alignment layers thereof are facing each other, and the electrodes thereof are in said X–Y plane and are right-angled with respect to each other; and (j) injecting a liquid crystal between the pair of substrate members.

3. The manufacturing method of claim 1 or 2, wherein the electrodes, which are to be utilized as anodes, are dipped into an electrolyte with a cathode, and a DC voltage is applied between the anodes and the cathode in order to form light shielding means.

4. The manufacturing method of claim 3, wherein the electrolyte contains a polymeric material and a colorant.

5. The manufacturing method of claim 1 or 2, wherein the electrodes to be used as cathodes are dipped into an electrolyte with an anode, and a DC voltage is applied between the cathodes and the anode in order to form light shielding means.

6. The manufacturing method of claim 5, wherein the electrolyte contains a polymeric material and a colorant.

7. The manufacturing method of claim 1 or 2, wherein a heat-treatment step is carried out after step (f) and prior to step (g), or after step (g) and prior to any step subsequent to step (g).

* * * * *